United States Patent
Daniel

[11] Patent Number: 5,844,471
[45] Date of Patent: Dec. 1, 1998

[54] HEATED VEHICLE EXTERIOR OBJECT SENSOR

[75] Inventor: Thomas R. Daniel, Fenton, Mich.

[73] Assignee: ITT Manufacturing Enterprises, Inc., Wilmington, Del.

[21] Appl. No.: 874,600

[22] Filed: Jun. 13, 1997

[51] Int. Cl.$^6$ ................................................ B60Q 1/00
[52] U.S. Cl. .................... 340/436; 340/435; 340/581; 340/693; 340/904; 340/943; 361/730; 367/909
[58] Field of Search ............................. 340/541, 552–557, 340/565, 567, 693, 435, 436, 437, 904, 943, 580, 581, 584; 367/96, 99, 107, 112, 907, 909; 361/600, 730

[56] References Cited

U.S. PATENT DOCUMENTS

| | | | |
|---|---|---|---|
| Re. 34,773 | 11/1994 | Dombrowski | 340/904 |
| 3,697,985 | 10/1972 | Faris et al. | 343/5 |
| 4,240,152 | 12/1980 | Duncan et al. | 367/108 |
| 4,450,430 | 5/1984 | Barishpolsky et al. | 340/904 |
| 4,467,313 | 8/1984 | Yoshino et al. | 340/904 |
| 4,626,850 | 12/1986 | Chey | 340/903 |
| 4,797,673 | 1/1989 | Dombrowski | 340/904 |
| 4,803,670 | 2/1989 | Chen | 367/99 |
| 4,910,512 | 3/1990 | Riedel | 340/943 |
| 4,980,869 | 12/1990 | Forster et al. | 367/99 |
| 5,229,975 | 7/1993 | Truesdell et al. | 367/907 |
| 5,373,482 | 12/1994 | Garthier | 367/99 |
| 5,394,292 | 2/1995 | Hayashida | 361/179 |
| 5,463,384 | 10/1995 | Juds | 340/435 |

*Primary Examiner*—Daniel J. Wu
*Attorney, Agent, or Firm*—J. Gordon Lewis

[57] ABSTRACT

A vehicle exterior object detector apparatus includes a transmitter and receiver carried within a housing and mounted by a holder to a support on the vehicle. A heater element is carried in the holder in surrounding relationship with one end of the transmitter and receiver housing for melting ice and snow build up on the end of the housing for proper operation of the transmitter and receiver.

18 Claims, 4 Drawing Sheets

HEATED VEHICLE EXTERIOR OBJECT SENSOR

BACKGROUND OF THE INVENTION

FIELD OF THE INVENTION

The present invention relates, in general, to vehicle exterior object detection devices.

It is known to provide one or more proximity detectors on the rear bumper and/or front of a vehicle to detect an object to the rear and/or front of the vehicle when the vehicle is moving rearwardly. Such devices are coupled to a control unit which provides a distance measurement to the detected object and activates an audible alarm or a series of lights provide an indication of the distance to the detected object.

Typically, the plurality of proximity detectors are mounted on the rear of the vehicle to cover an area slightly approximately as wide as the width of the vehicle. Typically, such proximity detectors are in the form of ultrasonic transceivers which transmit an ultrasonic signal rearwardly of the vehicle which is reflected by an object within the range of the transceiver. A suitable processing circuit determines the time between the transmission of the signal and the return of a reflected signal which is used to determine the distance to the detected object.

In the case of ultrasonic sensors, ice and snow build up on the bumper covering a portion or all of the outer surface of the ultrasonic transceiver interferes with the transmission and reception of ultrasonic waves which renders the object detector inoperative.

Thus, it would be desirable to provide a vehicle exterior object sensor with means to remove any ice or snow on the sensor mount. It would also be desirable to provide a vehicle exterior object detector in which such means are easily incorporated in the sensor mount without requiring extensive modification to existing sensor designs.

SUMMARY OF THE INVENTION

The present invention is an improved sensor apparatus for detecting an object exterior to a vehicle. The apparatus includes a transceiver including a transmitter and receiver pair for transmitting a signal and receiving a return signal reflected by an object within the range of the transceiver. Means are provided for mounting the transceiver on a support surface, such as the front and/or rear bumper of a vehicle. Means are carried on the mounting means for elevating the temperature of the mounting means to remove ice and snow from the transceiver for proper operation of the transceiver.

In a preferred embodiment, the transceiver transmits an ultrasonic signal. The mounting means is in the form of a housing carrying the active components of the transceiver. A holder means is coupled to the housing for mounting the housing on the support surface, such as either of the front or rear bumper of a vehicle. In a specific embodiment, the holder means has an enlarged diameter flange at one end of a through bore in which the end surface of the transceiver is disposed.

The means for elevating the temperature of the mounting means preferably comprises heating means carried on the housing for heating at least a portion of the housing surrounding the end surface of the transceiver. In one embodiment, the heating means comprises a resistive coil embedded or carried on in the enlarged diameter flange of the holder. In another embodiment, the heating means comprises a resistive film embedded within or carried on the enlarged diameter flange of the holder.

The apparatus of the present invention uniquely provides a means for removing an exterior build up of ice and/or snow on the exterior portions of the transceiver and/or the holder to enable proper operation of the transceiver in all environmental conditions. The heating means is conveniently mounted on the enlarged flange of the holder without requiring extensive modification to existing sensor and sensor holder designs.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
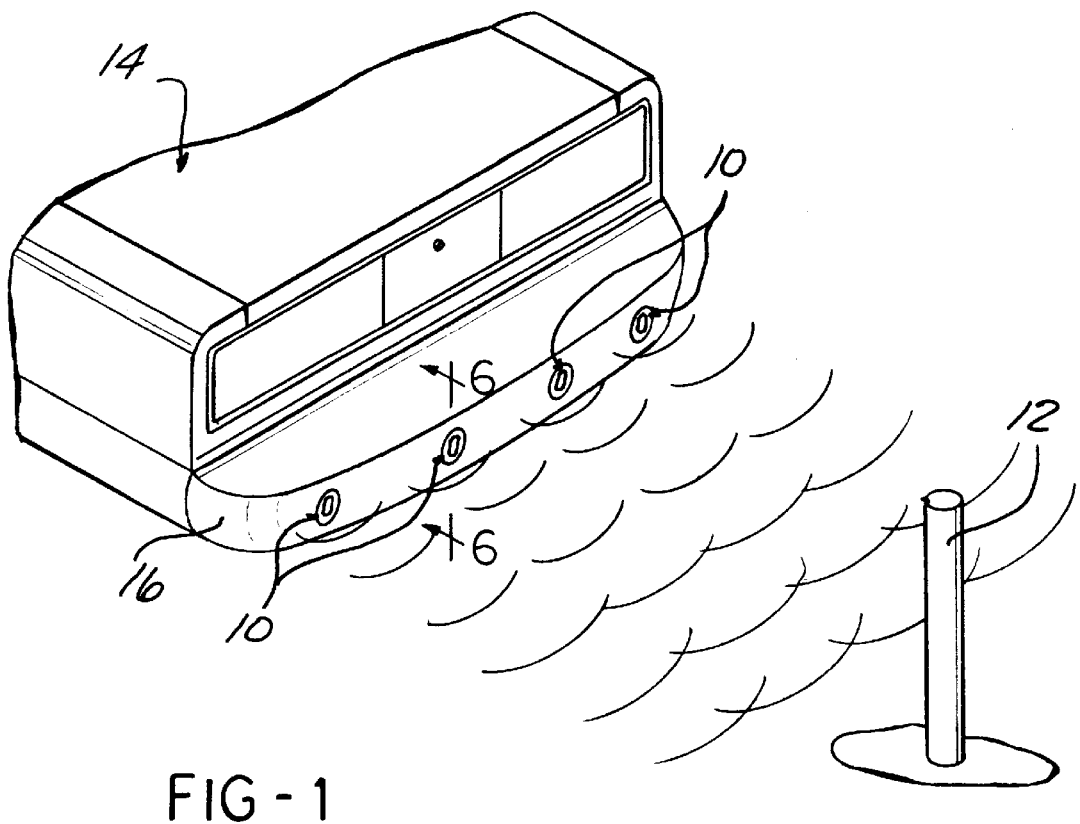
FIG. 1 is a perspective view of a heated vehicle exterior object sensor according to the present invention.

Referring now to the drawing, and to FIGS. 1–8 in particular, there is depicted a vehicle exterior object detector 10, which is adapted for detecting and providing an indication of object 12 to the front and/or the rear of a vehicle 14.

Preferably, a plurality of identical detectors 10 are mounted on one or both of the front bumper and the rear bumper 16 of the vehicle and laterally spaced apart along the length of the bumper 16 to provide a combined detection range approximately as wide as the length of the bumper 16. Although the drawing depicts a rear bumper 16, it will be understood that the sensor apparatus of the present invention can also be mounted on a front bumper of the vehicle.

The exterior object detector 10 is formed of a transceiver housing 20 and a transceiver mounting means or mount 22. The housing 20 is formed of an assembly of components including a one piece base 24 which has a hollow, tubular portion 26 and an integral, generally perpendicularly extending concave portion 28. A plurality of terminals, all denoted by reference number 30, are insert molded within the tubular portion 26 to provide connections between the operative elements of the transceiver mounted within the housing 20 and external electrical connections.

Figure 4:
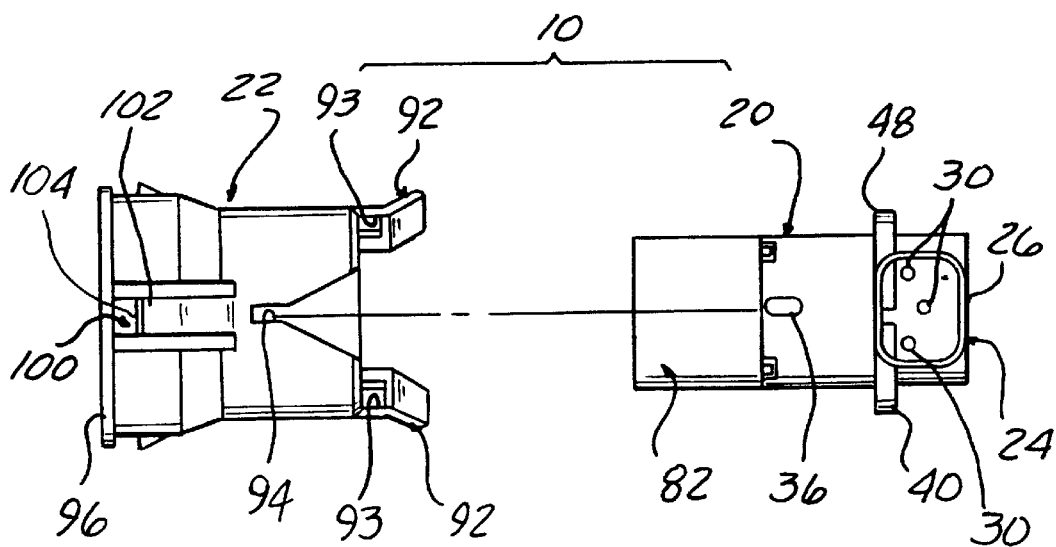
FIG. 4 is an exploded, bottom elevational view of the transceiver and mounting holder shown in FIG. 3.

The concave portion 26 is formed with a pair of parallel edges 32 and 34 at an upper end which have grooves extending therealong. A projection 36 is formed adjacent to one end of each groove 32 and 34, the purpose of which will be described in greater detail hereafter. As shown in FIG. 4, a key projection 36 extends outwardly from a lower surface of the concave portion 28 for keying the orientation of the housing 20 to the holder or mount 22, as also described hereafter.

A cover 50 also has a concave shape, generally complimentary to the concave portion 28 of the base 24. Parallel side edges 52 and 54 are engageable with the edges 32 and 34 of the concave portion 28. A recess formed in each edge 52 and 54 is engageable with one projection 36 on the edges 32 and 34 to align the cover 50 with the base 24. The cover 50 is fixedly mounted on the base 24 by means of a slide and latch or other suitable fastening means.

Figure 2:
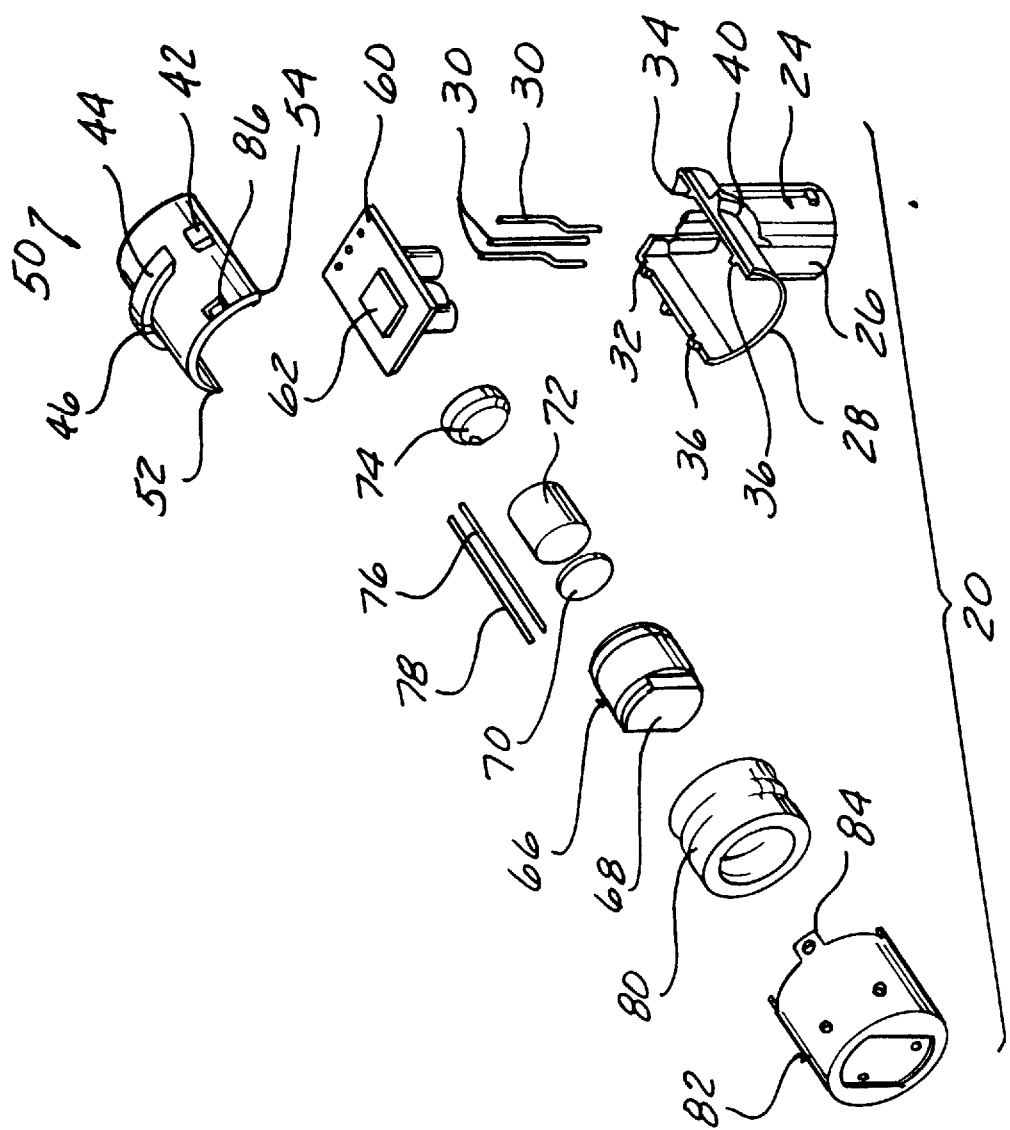
FIG. 2 is an exploded, perspective view of the transceiver portion of the heated vehicle exterior object sensor of the present invention.
Figure 3:
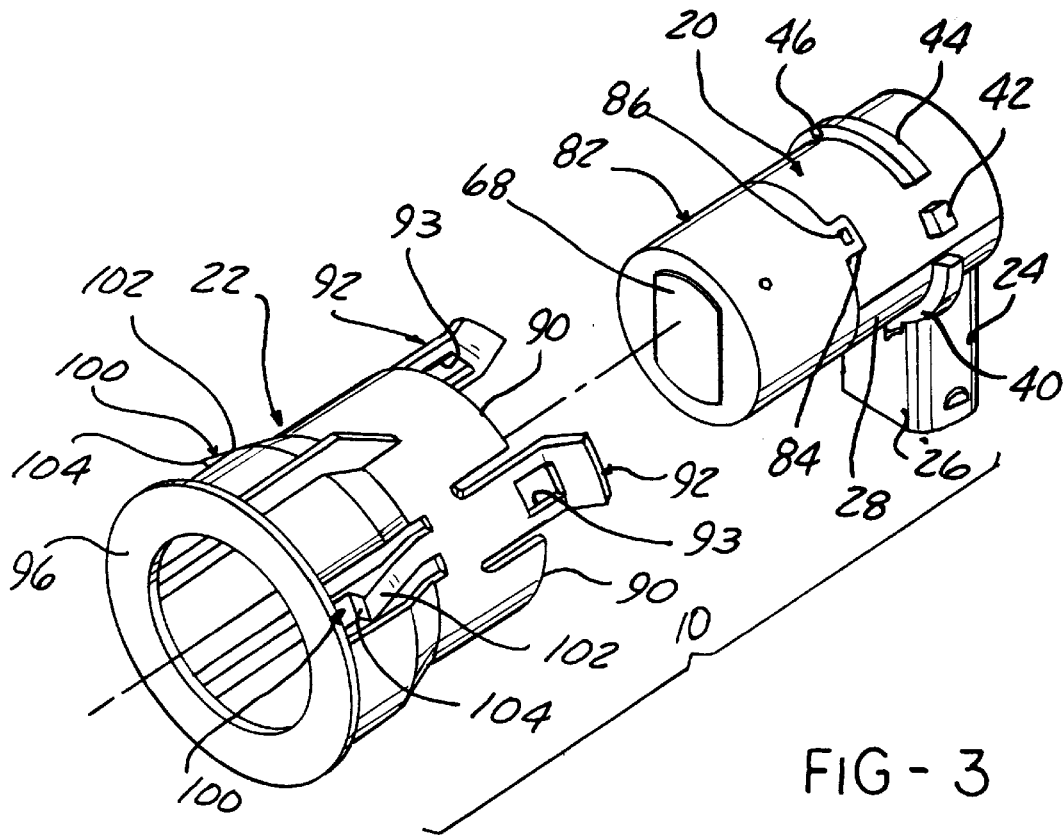
FIG. 3 is an exploded, perspective view showing the transceiver and mounting holder.

In addition, as shown in FIGS. 2–4, a plurality of co-planar ribs 40, 42, 44, 46 and 48 are co-planarily aligned and arcuately spaced about the concave portion 28 and the cover 50 when the cover 50 is engaged with the concave portion 28. The ribs 40, 44, and 48 have generally the same arcuate length and act as stops to limit insertion of the housing 20 into the mount or holder 22. The ribs 42 and 46 have a considerably smaller arcuate extent and form latch projections for latchingly receiving latch arms on the mount or holder 22, as described hereafter, to latchingly couple the holder 22 to the housing 20. At least the rib 42 has a ramp surface to assist in mounting the sensor in the holder 22.

A printed circuit board 60 is mountable within a cavity formed between the mated cover 50 and the concave portion 28 of the base 24. The printed circuit board 60 includes connections for the terminals 30 as well as integral conductive traces extending to pin connections on an integrated circuit chip 62 which is a control device, such as a microprocessor or ASIC, which executes a program for controlling the operation of the transceiver. A coil 63 is mounted on the pc board 60 and energized by the integrated circuit 62. A cap 65 adjacent to the coil 63 mounts in the base 24 to position the pc board 60 in the base 24. Although not shown, a potting compound fills the interior cavity between the cover 50 and the concave portion 28 to surround and sealingly position the printed circuit board 60 within the housing 20.

The integrated circuit 62 forms, shapes and amplifies signals with suitable circuitry to receive an echo signal reflected from an object detected in the range of the transceiver to a digital signal and then transmitting the digital signal to an external controller, such as a vehicle electronic control unit, via the terminals 30. Processing of the signal to determine the distance to the detected object is preferably done by the vehicle electronic control unit.

A membrane 66 preferably formed of machined aluminum has a generally cylindrical shape with a hollow interior bounded by an open end and an opposed closed end surface 68. The closed end surface 68 is machined to a flat surface and is preferably anodized. Mounted within the membrane is a sequential arrangement of a resonating ceramic disc, such as a piezoelectric disc 70, which engages an inner surface of the closed end surface 68 of the membrane 66 to transmit ultrasonic signals therethrough, a dampening element 72, a resilient or rubber plug 74 which closes the open end of the membrane 66, and a pair of wires 76 and 78 which connect the disc 70 to the integrated circuit 62.

After the disc 70, the dampener 72 and the plug 74 securely mounted within the membrane 66, the membrane 68 is inserted into an additional dampening ring 80, also formed of rubber, by example only. The ring 80 and the membrane 66 are then securely mounted within a cap 82.

The cap 82 has one or more axially extending fingers 84, each with an interior aperture positioned to engage projections 86 on the end of cover 50 and the concave portion 28 to releasably couple the cap 82 to the cover 50 and base 24.

As shown in FIG. 3, when the components are assembled within the end cap 82, the end face 68 of the membrane 66 engages the disc 70 which, when energized by the circuit 60, resonances and generates a signal which passes through and is shaped by the end surface 68 to form an ultrasonic wave.

Figure 6:
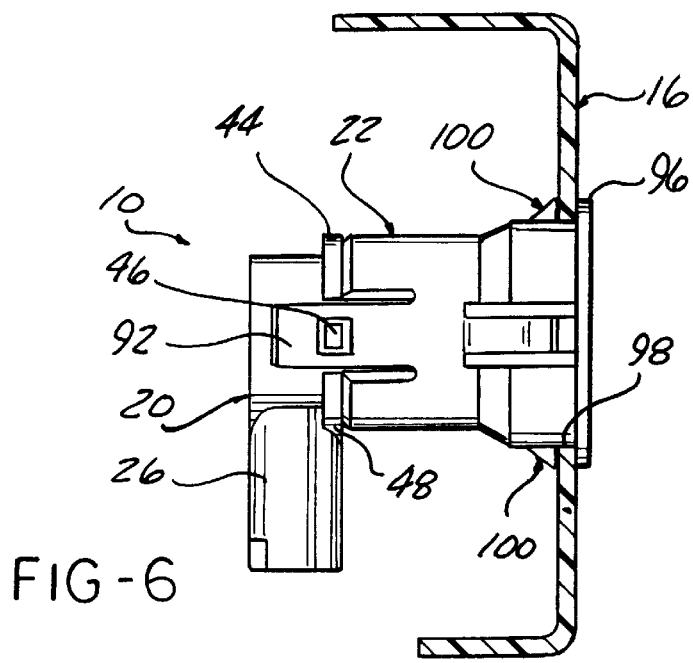
FIG. 6 is a cross-sectional view generally taken along line 6—6 of FIG. 1.

The mounting means 22 is preferably in the form of a holder, also depicted to by reference number 22, which releasably mounts the transceiver 20 to a fixed support, such as in an aperture formed in the bumper 16 of a vehicle 14 as shown in FIGS. 1 and 6.

The mounting means or holder 22, as shown in detail in FIGS. 3–7, is in the form of a generally cylindrical body having opposed ends and a through bore sized to receive the end cap 82. The first end of the holder 22 defines an annular edge 90 which is interrupted by at least one and preferably a plurality of two or more latch arms 92. Further, as shown in FIG. 4, an elongated key slot 94 with outward tapered ends is formed in the holder 22 and designed to slidably receive the key projection 36 on the base 24 to align the holder 22 with the transceiver housing 20. The annular edges 90 are adapted to engage the ribs 40, 44, and 48 on the transceiver housing 20 to limit the insertion of the housing into the holder 22.

Figure 5:
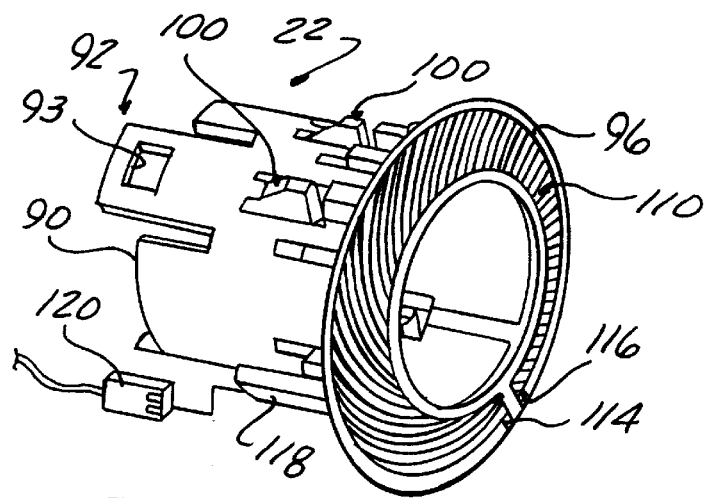
FIG. 5 is a perspective view of one embodiment of the mounting holder shown in FIGS. 3 and 4.

When the annular edges 90 engage the ribs 40, 44, and 48, the latch arms 92, each of which has an aperture 93 at an outer end, engages the shorter ribs 42 and 46 in a snap together connection to releasably interlock the holder 22 and the housing 20. It is seen in FIGS. 3, 5 and 6 that each latch arm 92 is spaced from adjacent portions of the body of the holder 22 by slots which position each latch arm 92 in a cantilevered manner from one end of the latch arm 92 integrally joined to the body of the holder 22 to enable each latch arm 92 to be urged radially outward upon initial engagement with the ribs 42 and 46 on the body 20. The holder 22 can be disconnected from the body 20 by outward force on the outer ends of the latch arms 92 sufficient to disengage the apertures 93 in each latch arm 92 from the respective ribs 42 and 46 on the body 20.

As shown in FIGS. 3–7, an enlarged diameter flange or bezel 96 is formed at an opposite end of the body of the holder 22 from the latch arms 92. The outer diameter of the bezel 96 is larger than the inner diameter of an aperture or bore 98 formed in the support surface, such as the vehicle bumper 16, to which the exterior object detector 10 is to be mounted, as shown in FIG. 6. At least one, and preferably a plurality, such as three, equicircumferentially spaced mounting arms 100 are carried on the body of the holder 22. Each mounting arm 100 is substantially identically constructed and includes a resilient arm integrally joined at one end to the body of the holder 22 and extending to an opposite end disposed adjacent to, but freely movable with respect to the bezel 96. Each mounting arm includes a tapered outer, raised surface 102 which terminates in an edge 104 spaced from the bezel 96. An annular slot or groove is formed between the bezel 96 and the edges 104 of each mounting arm 100 which is sized to the thickness of the support, such as the vehicle bumper 16, to which the holder 22 is mounted, as shown in FIG. 6.

The holder 22, in one example, can be mounted to the support surface or bumper 16 prior to connection to the transceiver housing 20. With reference to FIG. 6, the holder 22 is urged through the bore 98 in the support surface or bumper 16 until the bezel 96 contacts the outer surface of the bumper 16. During such insertion, the inner edges of the bumper 16 surrounding the bore 98 therein, engage and radially inward push the mounting arms 100 until the edges 104 of the mounting surface on each mounting arm 100 clear the inner surface of the bumper 16. At this time, each mounting arm 100 snaps outward capturing the bumper 16 between the edges 104 and the bezel 96. The transceiver housing 20 may then be coupled to the holder 22 to complete the vehicle exterior object detector 10 of the present invention. Alternately, the housing 20 can be mounted in the holder 22 prior to mounting the holder 22 in the bumper 16.

According to a unique feature of the present invention, as shown in one embodiment in FIG. 5, a means is provided for elevating the temperature of the holder 22 and, in particular, the bezel 96 to remove any snow or ice build up on the exterior end surface 68 of the membrane 66.

Figure 7:
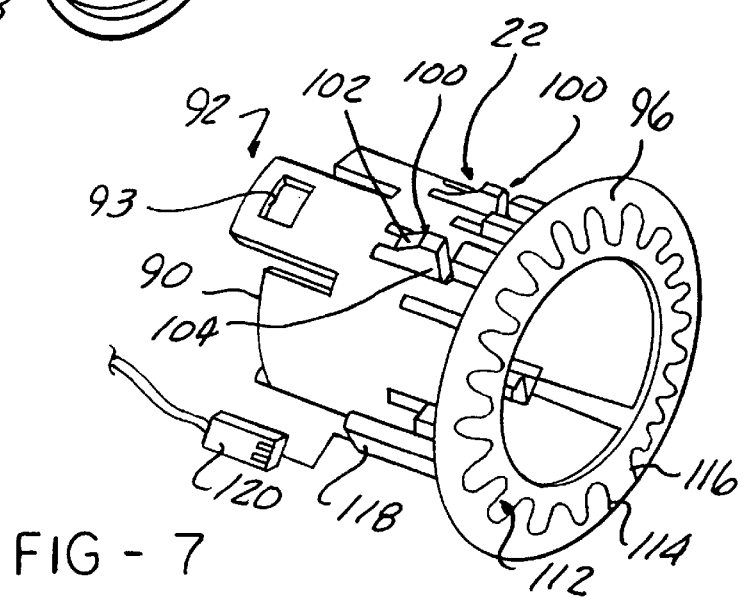
FIG. 7 is a perspective view of another embodiment of a mounting holder according to the present invention.

In the embodiment shown in FIGS. 5 and 7, the temperature elevating means is in the form of a heater means carried on the bezel 96. Preferably, the heater means, in the embodiment shown in FIG. 5, is in the form of a resistive grid or carbon film 110 which is integrally molded in the bezel 96 during the formation of the bezel 96 or afterwards by surface treatment of the bezel 96, such as via an electroplating process which forms a molded inert connect device (MID). The resistive grid or film 110 is disposed near the outer surface of the bezel 96.

In an alternate embodiment shown in FIG. 7, the temperature elevating means is in the exemplary form of a resistive wire 112 which is formed in a generally serpentine path on the bezel 96 by electroplating, insert molding, etc. Both of the resistive grid 100 and the wire 112 have opposed ends 114 and 116 which extend as conductive traces on the exterior surface of the bezel 96 and the body of the holder 22 to a suitable electrical termination or terminal 118 shown in both FIGS. 5 and 7. The terminal 118 may be an electrically conductive pad receiving a separate electrical connector 120 or an outwardly projecting contact which receives a snap on electrical connector 120. In this manner, an electrical circuit is completed from an exterior power source, such as a vehicle battery, to the resistive grid 110 or to the resistive wire 112.

Figure 8:
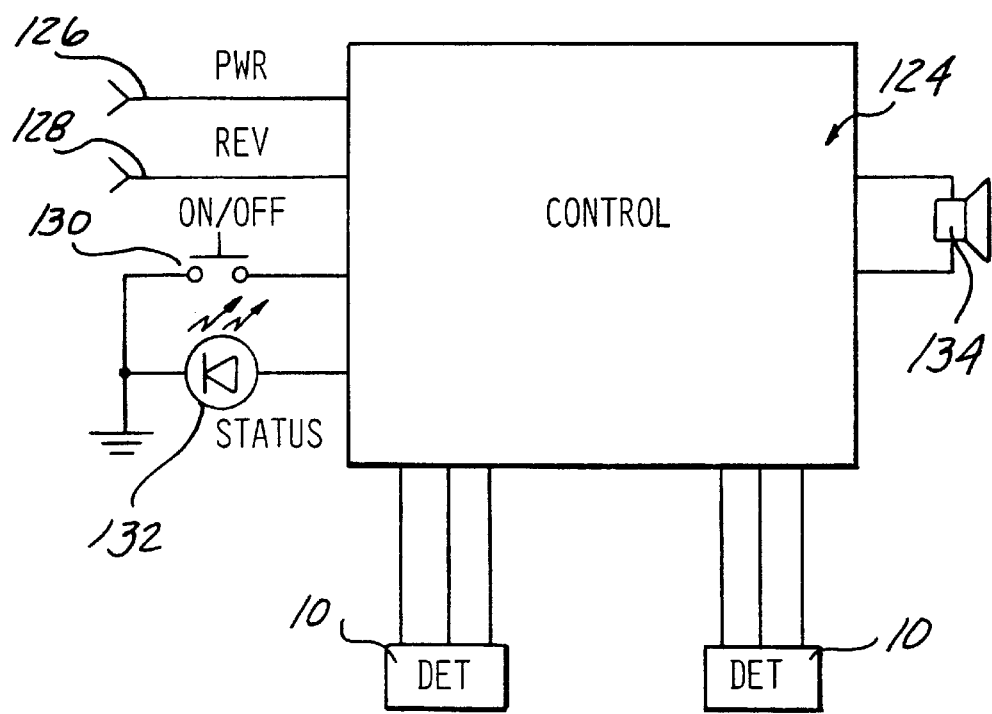
FIG. 8 is a schematic, block diagram of the control for the heated vehicle exterior object detector of the present invention.

Referring briefly to FIG. 8, there is depicted a control used with the vehicle exterior object detector 10. The control 124 is a dedicated electrical circuit or microprocessor based device receiving an electrical power input 126, a vehicle movement or engine running signal, such as a reverse input signal 128 when the vehicle is moving rearwardly in reverse gear or a forward input signal on forward vehicle movement within a preset speed range, an on/off switch 130, as well as a status input, such as an LED 132, indicating the on or off status of the exterior object detector 10.

The control 124 provides outputs to each of the detectors 10 mounted on the rear and/or front bumper of the vehicle. Specifically, the control 124 provides electrical power, a ground and a single wire for providing a control signal to activate each detector 10 to transmit a signal as well as providing a return path for the reflected signal where an object is detected within the range of any of the detectors 10.

An audible sound generator 134 is driven by an output signal from the control 124 and generates a sequence of audible sounds, such as successive beeps at a frequency or rate dependent on the distance to an object detected within the range of a detector. The control 124 provides a series of pulses to the sound generator 134 at a frequency whose attenuation rate increases as the distance between the vehicle and the detected object decreases. It will be evident that the sound generator 134 may be used with or replaced by a light display which can generate flashing lights, the frequency of which are dependent upon the distance to the detected object or a series of spaced lights, each corresponding to incremental distances.

Although not shown, a temperature sensor may be input to the control 124 or holder 24 to provide an ambient temperature signal. This will enable the control 124 to activate the temperature elevating means when the ambient temperature is below a preset temperature, such as 40° F.

In summary, there has been disclosed a unique means for elevating the temperature of a vehicle exterior object sensor which is capable of removing any snow and/or ice build up on the sensor which could interfere with or render the sensor inoperable. The temperature elevating means is integrally carried on the holder which mounts the sensor to a support surface on a vehicle thereby providing a simple, integral, assembly with a minimal number of separate components.

What is claimed is:

1. An object detection apparatus comprising:

transceiver means for transmitting a signal and receiving a return signal reflected off of an object within a range of the transceiver means;

means for mounting the transceiver means on a support, the mounting means including a holder coupled to the transceiver means, the holder having an end facing exteriorly of an exterior surface of the support and disposed adjacent an end of the transceiver means; and heating means, carried by the end of the holder, for elevating the temperature of at least the end portion of the transceiver means to remove meltable material disposed on the transceiver means.

2. The apparatus of claim 1 wherein the transceiver means transmits an ultrasonic signal.

3. The apparatus of claim 1 wherein the heating means comprises:

a resistive film carried on the mounting means.

4. The apparatus of claim 1 wherein the heating means comprises:

a resistive coil carried on the mounting means.

5. The apparatus of claim 1 wherein the mounting means further comprises:

the end of the holder having an enlarged end flange engageable with the support and disposed exteriorly of an exterior surface of the support.

6. An object detection apparatus comprising:

a transceiver for transmitting a signal and receiving a return signal reflected off of an object within a range of the transceiver;

the transceiver including a housing carrying a transmitter and a receiver;

means for mounting the housing on a support, the mounting means having an end facing exteriorly of the support and disposed adjacent to an end portion of the transceiver; and heating means, carried on the end, for elevating the temperature of the end portion of the housing of the mounting means to remove meltable material on the transceiver.

7. The apparatus of claim 6 wherein:

the mounting means has a through bore receiving the end portion of the housing therethrough, an end surface of the housing disposed substantially co-planarily with the end of the mounting means.

8. A mount for an object detection apparatus having a transceiver means for transmitting a signal and receiving a return signal reflected off of an object within a range of the transceiver means mounted within a housing having a signal transmission and receiving surface, the mount comprising:

a body having a through bore;

the housing of the transceiver mounted within the bore of the body of the mount;

an enlarged diameter end flange carried on the body and engageable with an exterior surface of a support, the signal transmitting and receiving surface of the housing of the transceiver disposed in proximity with the end flange for transmitting and receiving signals exteriorly of the end flange;

means for mounting the body of the mount to the support; and heating means, carried by the mounting means, for elevating the temperature of the signal transmitting and receiving surface of the housing of the transceiver means to remove any meltable material disposed on the signal transmitting and receiving surface of the housing of the transceiver means.

9. The mount of claim 8 wherein the heating means is carried on the end flange of the body.

10. The mount of claim 8 wherein the heating means comprises:

a resistive film carried on the body of the mount.

11. The mount of claim 10 wherein:

a resistive film is carried on the end flange.

12. The mount of claim 8 wherein the heating means comprises:

a resistive coil carried on the body of the mount.

13. The mount of claim 12 wherein:

the resistive coil is carried on the end flange of the body of the mount.

14. The mount of claim 8 wherein the mounting means further comprises:

at least one mounting arm carried on the body and spaced from the end flange by a distance to encompass a support therebetween when the body is inserted through a bore in the support.

15. The mount of claim 14 wherein the at least one mounting arm has an inclined outer surface.

16. The mount of claim 8 wherein the mounting means comprises:

latch means, carried on the body, for releasingly latching the body to the housing and trapping the support between the end flange of the body and the housing of the transceiver.

17. The mount of claim 16 wherein the latch means comprises:

latch projections extending from the body and releasingly engagable with latch members on the housing.

18. The mount of claim 17 wherein the latch arms are cantileveredly carried on the body.

* * * * *